Feb. 28, 1928.

J. A. PROCTOR

ELECTRICAL CONDENSER

Filed March 30, 1926     3 Sheets-Sheet 1

1,660,937

INVENTOR
John A. Proctor

BY
Philip Farnsworth
ATTORNEY

Feb. 28, 1928.

J. A. PROCTOR 1,660,937

ELECTRICAL CONDENSER

Filed March 30, 1926    3 Sheets-Sheet 2

INVENTOR
John A. Proctor

BY
Philip Farnsworth
ATTORNEY

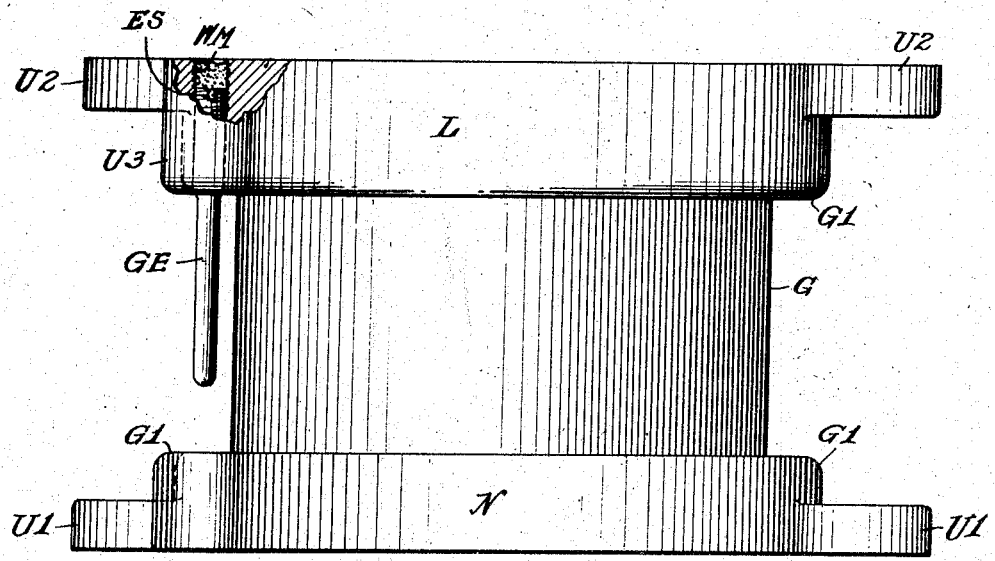

Patented Feb. 28, 1928.

1,660,937

UNITED STATES PATENT OFFICE.

JOHN ALBERT PROCTOR, OF LEXINGTON, MASSACHUSETTS, ASSIGNOR TO WIRELESS SPECIALTY APPARATUS COMPANY, OF BOSTON, MASSACHUSETTS, A CORPORATION OF NEW YORK.

ELECTRICAL CONDENSER.

Application filed March 30, 1926. Serial No. 98,435.

This invention relates to improvements in electrical condensers, useful particularly for high tension service, and more particularly in condensers of the sheet-stack type, especially wherein the stack for high potential service comprises a plurality of sections the faces of which are insulated from one another by insulating separating sheets between the sections in the stack, and the sections so separated at their faces being connected in series with one another by connections outside the stack between their respective armatures.

Among the various objects of the invention is that of providing a structure which is an improvement on the special type wherein the stack is enclosed by a casing consisting of insulating material surrounding the sides of the high potential stack, such casing also including metal end structures secured to said insulating portion at oppositely disposed openings thereof so that the metal end structures complete the enclosure of the stack and serve as terminals for the stack, the ends of the stack lying substantially adjacent the metal end structures.

Figure 1:
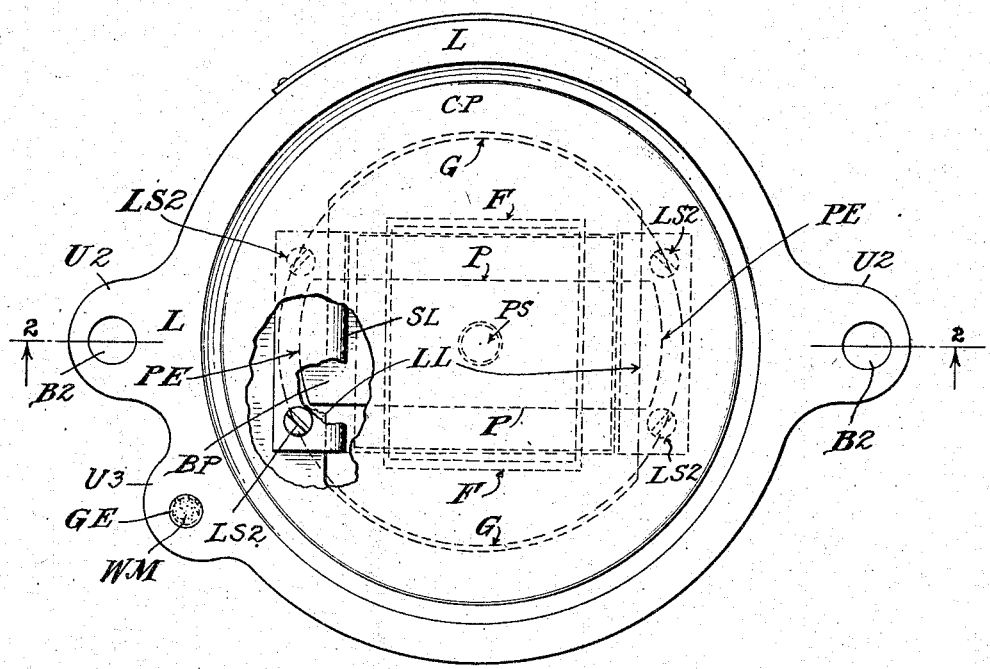
Figure 2:
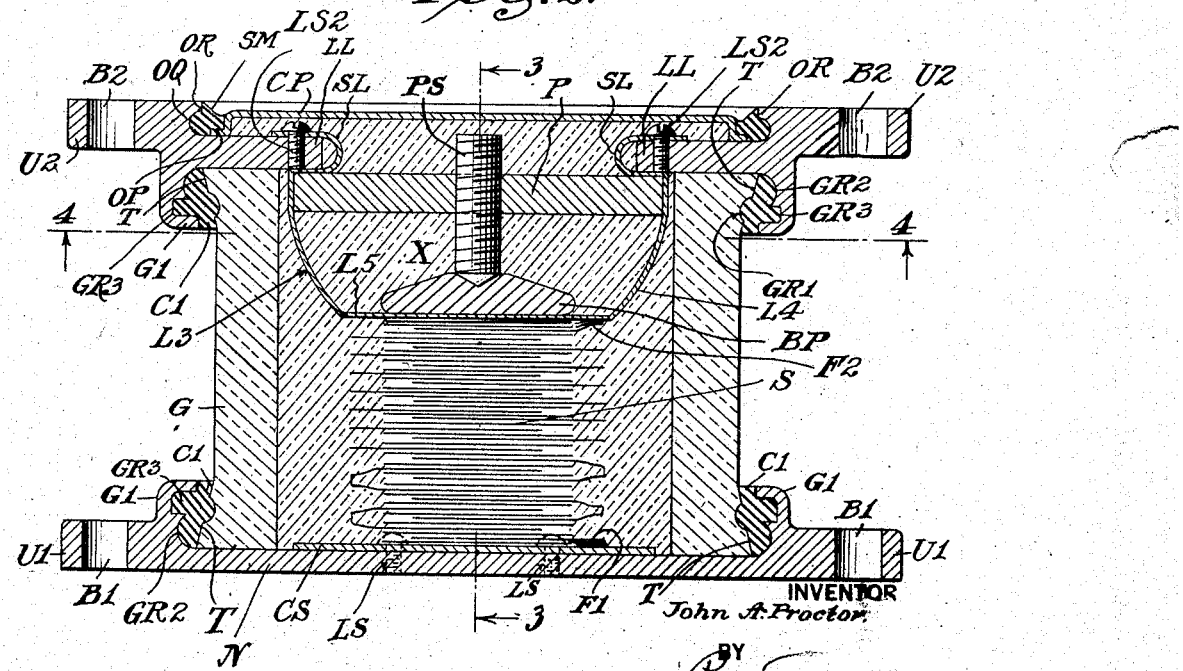
Figure 3:
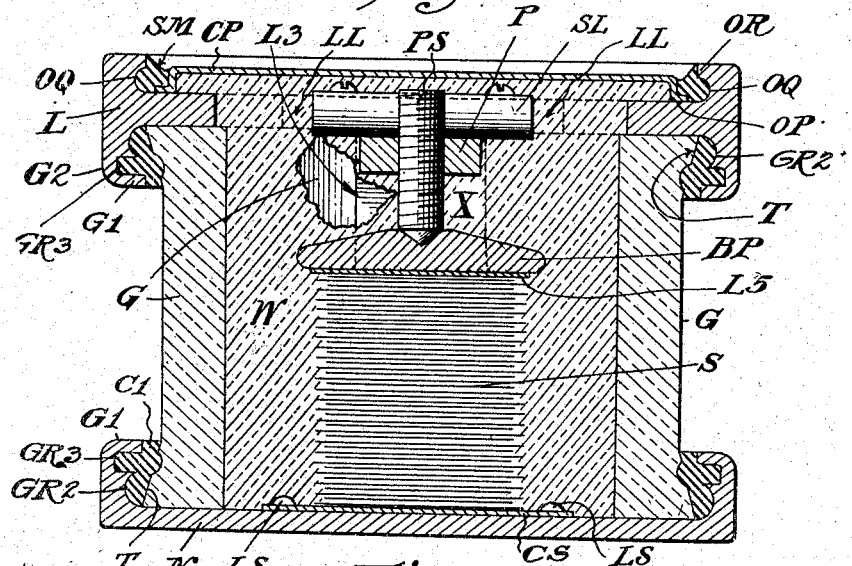
Figure 4:
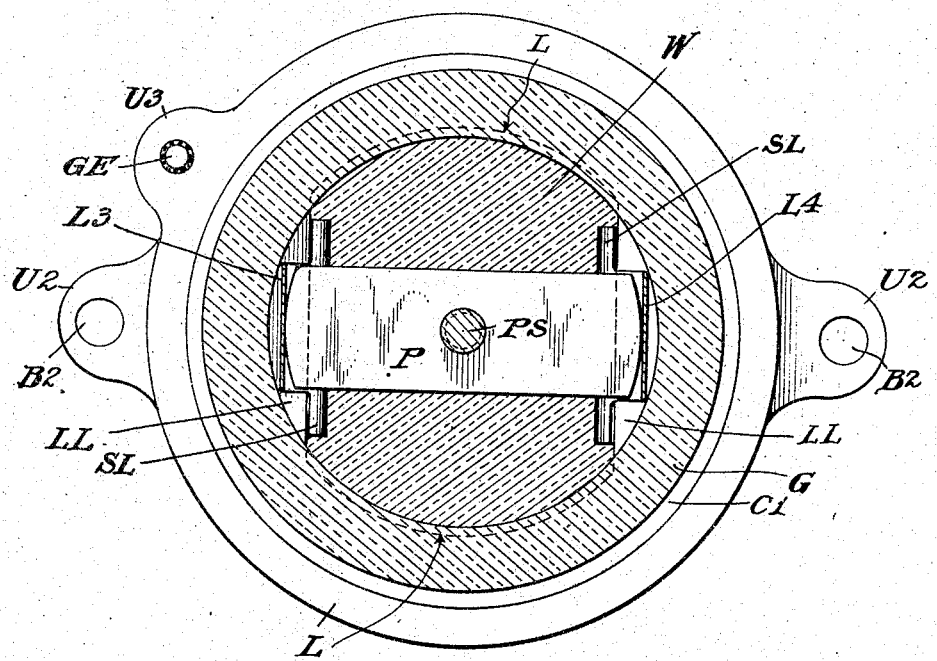

The invention consists of the various features of the construction substantially as described hereinafter and as shown in the drawings which illustrate a preferred form of the invention and of which Fig. 1 is a plan partly in section;
Fig. 2 is a section at 2—2 of Fig. 1;
Fig. 3 is a section at 3—3 of Fig. 2;
Fig. 4 is a section at 4—4 of Fig. 2, looking up (arrows, Fig. 2), and
Fig. 5 is a side elevation.

The general nature of the completed condenser can be understood best from Fig. 5 wherein casing G (of pyrex glass or of porcelain with an exterior brown glaze) is in the form of a tube or cylinder entirely surrounding the sides of the stack S, (Fig. 2), and L and N are metal end structures secured to the open ends of glass tube G at the oppositely disposed openings therein (Fig. 2). The stack S may be and preferably is the well known series-sectional stack adapted for high potential service, and is located with its two ends more or less adjacent to the end openings in glass casing G and near or adjacent to the two metal end structures L, N. The metal ends L, N extend laterally or radially outward from glass casing G, being preferably cemented (Fig. 2) to the outside of casing G; and the outer rims U¹, U² of N and L are provided (Fig. 2) with alined perforations B¹, B² whereby a plurality of units like Fig. 5, with like ends L, N are adapted to be stacked one upon another, metal-bolted together and thereby electrically connected in series with one another to constitute a condenser of very high potential indeed.

The casing G preferably is of pyrex glass whereby it is very strong mechanically and said material furnishes an excellent dielectric, withstanding considerable heating and all mechanical and electrical stresses incident to its combination in this condenser. The pyrex glass also permits a low thermal coefficient of expansion which is important in connection with its cementing to the metal ends L, N. This casing, when of pyrex glass, possesses great homogeneity constituting it a highly desirable dielectric material for this purpose. Its surface is not glazed. Its transparency makes easy the inspection of flaws in itself and in the embedment W (Fig. 3) of readily fusible insulating material, such as wax or the like, filling the space between casing G and the stack S. The glass casing G is blown in a mold and is thereby accurately produced to desired dimensions, The metal ends L, N, and particularly end N, are die-cast, preferably of aluminum, and thereby formed initially with the cementing grooves shown in Fig. 2, just as the cementing grooves in glass casing G are formed in the mold-blown operation.

The protective spark-gap electrode GE (Fig. 5) is supported in a radially outwardly projecting portion or boss U² of one of the end members L, N, (as L as shown in Fig. 5) so as to lie outside of and parallel to glass casing G, the latter thereby being located between the sides of enclosed stack S (Fig. 2) and the electrode GE (Fig. 5). The end of electrode GE which is supported in end member L is threaded as shown and thereby is adjusted in the threaded perforation thru member L, during the process of manufacture and test, so that the portion of the electrode extending toward opposite potential end metal member N is separated therefrom and definitely set for a voltage breakdown which is somewhat in excess of the working potential of the condenser.

This voltage may be from twenty-five to fifty per cent above the working potential. Thereby sparking between electrode GE and terminal N will take place if the condenser terminals L, N should be subjected to greater potential, so that stack S itself is prevented from being subjected to potentials as great as such sparking potential and which might injure stack S. Upon such setting of the electrode to the desired sparking distance, the remaining unfilled portion of the perforation thru member L (top, Fig. 5) is filled with a material WM such as readily fusible Wood's metal for the purpose of preventing access to and interference by the user. The over-all length of electrode GE is made such that when this sparking end is at the proper distance from end N, its other end leaves a space in the perforation thru end N, permitting the reception in such space of the fusible metal seal WM.

With reference to Figs. 1-4, and particularly Figs. 2-3, these show the interior of the casing formed of the vitreous side wall G and the metal ends L and N. In the process of manufacture the parts G, L and N first are combined in the manner shown in Figs. 2 and 3. These separate parts have been formed with their cementing surfaces and grooves shown and each metal end successively is put in place on its end of glass casing G and cemented thereto by the application of cement $G^1$ in said facing grooves and surfaces, and in the spaces between the exterior of tube G and members L and N. The glass casing G is formed with the tapering surfaces T as shown. The members L, N are formed with annular projections $G^1$, and with internal grooves $GR^2$ and $GR^3$ as shown, the grooves $GR^2$ facing the taper T of glass casing G, and the groove $GR^3$ facing groove $GR^1$ in glass casing G. The inner walls of annular projections $G^1$, including the two said grooves therein, ($GR^2$ and $GR^3$), are spaced from the facing portions of the outer surface of casing G, and the cement $C^1$ fills this space including all the grooves in both the metal parts L and N, and in the glass casing G. Thereby the metal end structures L and N are securely and permanently united with glass casing G forming sealed annular joints, in such manner that casing G is not injured by the stack clamping strains to be described, it having been found by me that such casing G withstands without injury to itself all the tension strains of clamping the stack S, with a mechanical pressure on the stack ends of the order of 1,000 pounds or more per square inch of electrostatically active area of the stack sheets.

After parts L, N and G have combined as above, the stack S is inserted within casing G thru the opening in upper end structure L, the lower end of the stack resting on the closed bottom metal member N. Before the stack is inserted within the casing, however, a thin copper strip CS has had soldered to it the bunch of foils projecting from the side of the bottom end section of stack S, so that when the stack S (Fig. 2) with such strip CS attached is inserted in the casing, the lower surface of strip CS is put in contact with the surface of lower metallic end N; and parts of strip CS which project beyond the stack are clamped to metallic end N by means of headed screws LS (Figs. 1-3) which are threaded in end N, so that strip CS soldered to the foils at one point, and clamped to N preferably by the four screws LS shown, affords a good electrical and thermal connection from the bottom end section of the stack to metallic end N as a circuit terminal exposed to air outside the casing. Also strip CS extends between the end of stack S and metallic end N so that when thereafter the stack is clamped against bottom end N, the strip CS is clamped thereby to end N at the bottom surface of strip CS intermediate the screws LS.

After stack S has been inserted in the casing as above, there is placed on top of it a stack lead of special construction, and comprising a thin copper sheet, the central portion $L^5$ of which extends substantially over the top of the stack, and end portions $L^3$, $L^4$ of which extend upwardly from opposite sides of such intermediate portions, the said ends $L^3$, $L^4$ being narrower (Fig. 3) than the part $L^5$ of the copper sheet which lies on top of stack S. Then on top of said sheet lead is placed a metal bearing plate BP. Next an adjustable pressure-applying plate P of steel is inserted in the casing. This plate P is oblong (Figs. 2-3). A collar L of the top end structure is formed with two shoulders LL at diametrically opposite sides of the opening thru it (Figs. 1 and 3). Shoulders LL project radially inward. After oblong pressure plate P is inserted thru the opening between opposite shoulders LL, it is turned 90° to bring its ends under said shoulders. Before the insertion of plate P, the opposite ends $L^3$, $L^4$ of the top stack lead are brought upwardly around the ends of shoulders LL. Then pressure screw PS is screwed thru a central hole in plate P, with its lower pointed end engaging against bearing plate BP. Continued screwing up of PS puts stack S under end-to-end compression via the upward pressing of plate P against lead-ends $L^3$, $L^4$, and shoulders LL of collar L, whereby the glass casing G becomes the tension member of the system clamping stack S, and also the ends $L^3$, $L^4$ of the top stack lead are clamped between the upper surface of plate P and the lower surfaces of shoulders LL of end L. The upper ends SL of the stack lead are bent over on top of shoulders LL, and also clamped thereto by headed screws LS². After the stack has been properly clamped, say to the usually desired order of 1,000 pounds per square inch of active area of the stack sheets, then the top of pressure screw PS is cut off. The height of the casing is adapted to the desired length of stack, so as to provide the clamping tolerance space X between the top of bearing plate BP and pressure plate P, to permit proper operation of the clamping means during manufacture.

Before the stack-passage in end L is closed, the space inside the casing around the sides of stack S is filled with the molten insulating material W (as paraffine wax), the oblong shape of plate P permitting filler W to extend up above plate P, embedding the clamping means and stack-end connections as well as stack S.

The above described conditions of the stack leads at top and bottom are very advantageous in providing improved and adequate conductivity for electrical currents, and, to some useful degree, for heat. After stack S is clamped, it presses lower stack lead CS against bottom end N, and at the other end, bearing plate BP is pressed into good contact with the upper copper sheet stack lead at L⁵ so that three conducting paths are provided from the upper end section of the stack, two thru the copper sheet lead parts L³, L⁴; and the third thru metal parts BP, PS, P and lead ends SL, to metal collar L constituting one circuit terminal of the stack. When one of the unit condensers hereof is mounted end-on with duplicate units, such units are connected in series by clamping bolts extending thru holes B¹, B² in the bosses U¹ formed integral with ends L and N.

Electrical testing of the condenser, and the adjustment of gap electrode GE preferably are effected prior to the introduction of the insulating filling W.

After filling W has cooled and solidified, the stack-passage thru end L is closed and sealed, said opening being the one thru which the interior parts have been passed in the above described assembly. The closing of said opening is effected by metal cover CP which may be of sheet metal because it is not subject to any of the stack clamping strains. The sealing is effected by the introduction of sealing material SM in the annular space between the rim of cover CP and the adjacent annular surface of end collar L. This sealing material may be anything desired and may be a mixture of Portland cement and Medusa cement or sulfur or it may be a mixture of sulfur and plaster of Paris. Preferably the cement is strong enough to seal cover CP permanently in place; and in such a case members L and CP are provided with projections which interlock with the cement; that is, cover CP is provided with an annular outward projection OP, and end collar L is provided with inward annular projection OR above a groove OQ, so that the joint between L and CP is a locking as well as a sealing joint.

I particularly point out and distinctly claim the part, improvement or combination which I claim as my invention or discovery, as follows:—

1. An enclosed high tension condenser construction comprising a series sectional stack having opposite potential ends; metal end structures one of which has an opening permitting passage of the stack; leads fused to armatures of the end sections of the stack and conductively connecting such opposite potential stack ends respectively with said metal end structures; means clamping said leads to said metal end structures; a metal cover secured by sealing material to the metal end structure which has the opening, and closing and sealing said opening; an electrode for a protective spark-gap, supported in one of said metal end members and extending toward the other into protective sparking distance thereof; and a casing of insulating material located between said gap electrode and the sides of the stack, surrounding the stack sides and secured to and supporting said metal end structures of opposite potential and insulating them from one another, and insulating the sides of the stack from the spark-gap electrode.

2. An enclosed condenser construction comprising a condenser stack and a casing therefor consisting of two metal end structures and an intermediate glass casing-portion secured by sealing material to said metal end structures; one of said metal end structures being formed with a stack-passage; leads fused to opposite potential armatures of the stack and clamped respectively to said metal end structures; and a metal cover secured by sealing material to said metal end structure having the stack-passage, and closing said passage.

3. An enclosed high tension condenser construction comprising a series sectional stack, metal end structures, one of which is formed with a stack passage; an insulating casing extending around the sides of the stack and secured to said metal end structures; screw-clamping means inside said insulating casing between one end of the stack and the metal end structure formed with the stack passage; leads connecting said metal end structures to opposite potential sections of the stack; a metal cover over said clamping means, closing the stack passage in said end structure and secured by sealing material to said end structure around said passage; said metal end structures extending radially outward from the insulating casing; and a protecting spark-gap electrode having one end electrically connected to and supported in one of said metal end structures and extending along the outside of the insulating casing and within protective sparking distance of the other metal end structure.

4. An enclosed high tension condenser construction comprising a mold-blown glass casing having oppositely disposed openings, and formed with cementing grooves; a series sectional high tension stack having its ends located in the vicinity of said casing openings; metal end structures formed with cementing grooves facing the cementing grooves in said glass casing; and cementing material filling said cementing grooves and securing the end structures to the ends of said glass casing at the respective openings thereof and in the vicinity of said stack ends, and closing the opposite openings; and threaded adjustable metallic means between a stack end and one of said metal end structures and putting the stack under compression and the glass casing under tension via said metal end structure.

5. An enclosed high tension condenser construction comprising a casing of insulating material having oppositely disposed openings, a series-sectional stack having its ends located in the vicinity of said openings; a circuit terminal structure secured to an end of said insulating casing in the vicinity of one of the openings thereof; an electrically conducting lead from a stack section and extending across an end of the stack; a metal clamping member bearing on the portion of said conducting lead which extends across the stack end; a second conducting clamping member bearing against said circuit terminal structure; said lead extending between said second clamping member and said terminal structure; and a compressing member one end of which engages said first clamping member and the other end of which is threaded in the second clamping member, whereby the conducting lead is clamped against the two clamping member and the circuit terminal structure.

6. An enclosed high tension condenser construction comprising a casing of insulating material having oppositely disposed openings, a series-sectional stack having its ends located in the vicinity of said openings; a circuit terminal structure secured to one end of said insulating casing in the vicinity of one of the openings thereof; a conducting lead from a stack section located near one casing opening; a metal member clamping one portion of said lead between the adjacent stack end and the metal member itself; and a metal member clamping another portion of said lead to said circuit terminal structure.

7. An enclosed condenser construction comprising a casing consisting of insulating sides and of metal end structures secured thereto; a stack enclosed by said casing; metal stack-clamping means inside the casing between a stack end and of one of said metal end structures; and a stack-lead extending between said clamping means and said metal end structure and thereby clamped between them in conductive relation with the metal end structure.

8. An enclosed high tension condenser construction comprising a casing of insulating material having oppositely disposed openings, a series-sectional stack having its ends located in the vicinity of said openings; metal terminal structures secured to the ends of the insulating casing in the vicinity of said openings; metal clamping means extending from one stack-end to one of said metal terminal structures and putting the insulating casing under tension and the stack under compression; and a conducting lead extending from a stack section across the end of the stack under said metal clamping means and between said metal clamping means and said metal terminal structure.

9. An enclosed high tension condenser construction comprising a casing of insulating material having oppositely disposed openings, a series-sectional stack having its ends located in the vicinity of said openings; metal end structures secured to the ends of the insulating casing and cooperating with the casing to compress the stack from end to end, one of said metal end structures being formed with an opening permitting passage of the stack, and a metal cover for such opening in such end structure; sealing securing material around the joint between the metal end structure and said metal end; and projections interlocking with said material and extending therein respectively from said metal end structure and metal cover.

10. An enclosed high tension condenser construction comprising a casing of insulating material having oppositely disposed openings, a series-sectional stack having its ends located in the vicinity of said openings; metal end structures secured to the outside of the ends of the insulating casing and projecting radially outward from the insulating casing; said metal end structures being conductively connected to opposite potential stack sections; and a protective spark-gap electrode, outside the insulating casing, threaded and supported in an outwardly projecting portion of one of said end structures, extending toward the other metal end structure parallel to and outside of the insulating wall of the casing, and adapted to have its end spaced from said other metal end structure for break-down somewhat in excess of the operating potential of the condenser; the first end structure being formed with a threaded perforation receiving said electrode; the gap-electrode having such length that when adjusted as specified it leaves a portion of said perforation open; and sealing material located in said perforation opening.

11. An enclosed high tension condenser construction comprising a series-sectional stack having opposite potential ends; metal end structures; leads conductively connecting the opposite potential ends of the stack respectively with said metal end structures; an electrode of a protective spark-gap supported in one of said metal end structures and extending toward the other into protective sparking distance thereof; and an insulating casing extending around the sides of the stack, secured to and supporting said opposite potential metal end structures and insulating them from one another, and located between said protective gap electrode and the sides of the stack.

12. An enclosed high tension condenser construction comprising an insulating casing having oppositely disposed openings; a series-sectional stack having its ends located in the vicinity of said openings; metal end structures secured respectively to the ends of said insulating casing at the openings thereof; stack leads respectively fused to the armatures of different stack sections; screws respectively clamping said respective leads to said metal end structures; and metal stack-clamping means located between a stack end and one of said metal end structures; one of said stack leads extending between a stack end and the adjacent metal end structure and thereby clamped to the latter; and the other of said stack leads extending between said clamping means and the adjacent metal end structure and thereby clamped to the latter.

13. An enclosed high tension condenser construction which comprises a series sectional stack; an insulating casing extending around the sides of said stack; a metal end structure secured to an end of said insulating casing at one of the openings thereof; a flexible stack lead fused to the armatures of a stack section and extending over a stack end and to said metal end structure; and adjustable metal stack-clamping means extending between the metal end structure and the adjacent part of the stack lead on the one hand, and on the other hand, the portion of the stack-lead extending across the end of the stack, thereby putting the insulating casing under tension and the stack under compression and clamping the stack lead to the metal stack-clamping means and to the metal end structure.

14. An enclosed high tension condenser construction comprising an insulating casing having oppositely disposed openings; a series-sectional stack having its ends located in the vicinity of said openings; a metal end structure secured to one end of said insulating casing; metal stack-clamping means located between a stack-end and said metal end structure; and a circuit lead fused to the armatures of a stack section and having a portion clamped between the stack end and said clamping means, and having another portion clamped between said metal end structure and said clamping means.

15. An enclosed high tension condenser construction comprising an insulating casing having oppositely disposed openings, a series-sectional stack having its ends located in the vicinity of said openings; circuit terminal structures secured to the ends of said insulating casing at the openings thereof; conducting leads fused to armatures of different stack sections and extending respectively to said circuit terminal structures; and screws respectively clamping said lead ends to said circuit terminal structures.

16. An enclosed high tension condenser construction comprising a series-sectional stack, an insulating casing surrounding the sides of the stack; a metal circuit terminal structure secured to an end of said insulating casing in the vicinity of one of the openings thereof; and an electrically conducting lead from a section of the stack, two ends of such lead extending to said circuit terminal structure, and an intermediate part of said lead extending across an end of the stack; and metal means clamping said intermediate portion of said lead against the stack end and also clamping the two ends of the lead against said circuit terminal structure.

17. An enclosed high tension condenser construction comprising a series-sectional stack having opposite potential ends; two metal end structures electrically connected with said ends, one at least of which is formed with a stack-passage opening; a casing of insulating material having opposite end openings and secured at its ends to said metal end structures; a metal cover located outside the casing and extending over the stack-passage in said metal end structure and spaced annularly from said end structure; projections from said cover and end structure extending into said annular space; and cementing sealing material in said space around said projections whereby said end structure and cover are interlocked with the cement.

In testimony whereof I hereunto affix my signature.

JOHN ALBERT PROCTOR.